United States Patent
Zadra

[19]

[11] Patent Number: 6,082,172
[45] Date of Patent: Jul. 4, 2000

[54] SYSTEM AND METHOD FOR CHECKING THE QUALITY OF HAMMERING OPERATION ON A MECHANICAL COMPONENT DURING THE HAMMERING OPERATION

[75] Inventor: Alessandro Zadra, Turin, Italy

[73] Assignee: Comau, S.p.A., Turin, Italy

[21] Appl. No.: 09/151,802

[22] Filed: Sep. 10, 1998

[30] Foreign Application Priority Data

Oct. 14, 1997 [IT] Italy .................................. TO97A0905

[51] Int. Cl.[7] ...................................................... G01L 5/00
[52] U.S. Cl. .......................................... 73/11.01; 73/12.09
[58] Field of Search ............................... 73/11.01, 11.02, 73/11.03, 11.04, 12.01, 12.04, 12.06, 12.09, 12.12, 12.13, 12.14

[56] References Cited

U.S. PATENT DOCUMENTS

| 4,300,397 | 11/1981 | Kempen | 73/818 |
| 5,056,024 | 10/1991 | Stuyts | 701/29 |
| 5,756,877 | 5/1998 | Nozaki | 73/11.09 |

*Primary Examiner*—Max Noori
*Attorney, Agent, or Firm*—Sughrue, Mion, Zinn, Macpeak & Seas, PLLC

[57] ABSTRACT

A system and a method are used for checking the quality of a hammering operation to provide an interference fit of a component relative to a seat. A load cell and a linear transducer provides signals indicative of a hammering force applied to the component and the linear displacement of the component. A derivative signal is provided of the hammering force with respect to time. The derivative signal is analysed as a function of the linear displacement to check the quality of the hammering operation.

5 Claims, 5 Drawing Sheets

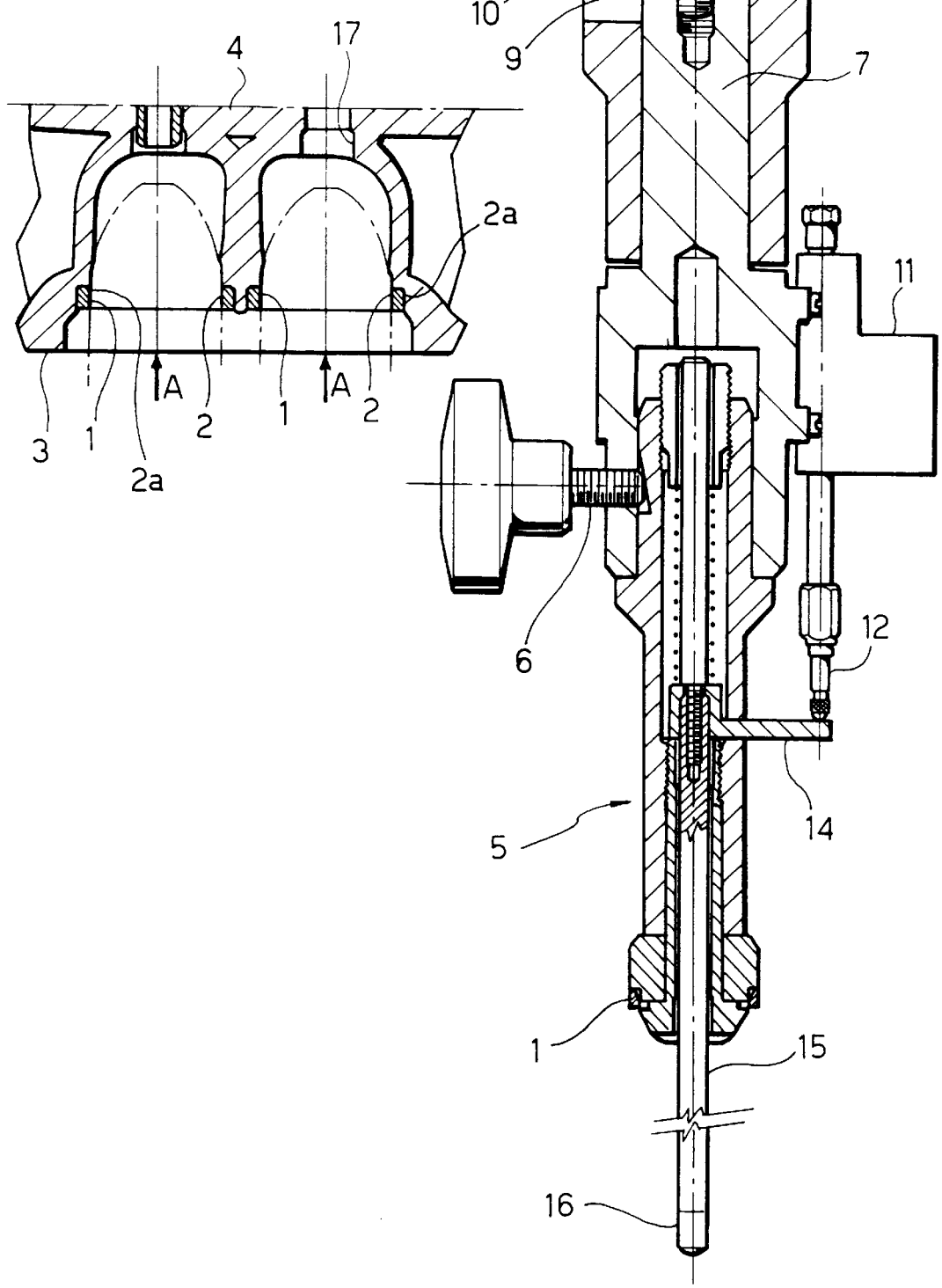

SYSTEM AND METHOD FOR CHECKING THE QUALITY OF HAMMERING OPERATION ON A MECHANICAL COMPONENT DURING THE HAMMERING OPERATION

BACKGROUND OF THE INVENTION

"System and method for checking the quality of a hammering operation on a mechanical component during the hammering operation"

The present invention relates to a system and a method for checking the quality of a hammering operation on mechanical components, during the hammering operation. The expression "hammering operation" in the present description and in the claims is used to indicate an operation by which a component is pressed into a cooperating seat until an interference fit coupling is achieved. A possible application of the system and method according to the invention lies in checking the quality of the assembling operation of the seating rings for the valves of an internal combustion engine, during assembling of the engine cylinder head by means of automated tools.

During the hammering operation of a mechanical component, such as the hammering of a ring of the above described type within a seat provided therefor on the lower surface of the cylinder head of an internal combustion engine, various inconveniences may arise. A first possible problem takes place when the component to be hammered is out of tolerance, i.e. when the interference between the component and the seat therefor is greater than the maximum interference permitted by the tolerances of the coupled elements or lower than the minimum theoretical interference. In the first case, the excessive force generated by the high interference may prevent the ring from coming fully into abutment against its seat. Therefore, a gap, even of small dimension (0.01 mm), may remain between the ring and the seat which gives rise to malfunctions during use of the engine. In the latter case, the hammering force is very low so that the ring may come out of its seat during operation of the engine, due to the mechanical and thermal stresses.

In general, the above described problem can be solved easily by monitoring the value of the hammering force to which the component is subjected during its movement in the hammering operation. If this force is greater or lower than the values respectively corresponding to the maximum interference coupling and the minimum interference coupling, the fit coupling is to be considered unacceptable. Devices for controlling the quality of the hammering operation which are able to carry out this analysis have been already known and used.

A second type of problem takes place in the case of a rupture of the component during the hammering operation. This problem is to be considered similar to the one previously described, since the rupture of the component during the hammering operation implies an immediate decrease of the interference between the component and its seat and hence an abrupt decrease of the hammering force during the central portion of the travel of the component. This type of problem, which can cause clearly problems on the engine, can be easily detected by an analysis of the value of the hammering force during the travel for obtaining the hammering operation, by means of the known devices which are already in use.

However, the devices for controlling the quality of the hammering operation which are presently used are not able to detect the existence of further types of problems reliably.

One of these problems is the one due to the presence of foreign bodies, typically machining chips, within the seat for receiving the component. The presence of these chips prevents the component, such as a valve ring, from coming into abutment against the bottom of its seat throughout the whole circumference of the seat. Also this type of defect may affect the operation of the engine. The presence of chips within the seat implies a variation of the force opposing hammering of the component during the end stage of the hammering stroke (about 3–4 hundredths of millimetre before the component reaches the end position in abutment against the seat bottom). There is no way to detect this defect by a checking operation of conventional type, by considering maximum admissible values of the force calculated as an absolute function of the displacement, since this defect takes place within a range, with respect to the absolute position during hammering, which is comprised within the admissible positioning tolerances of the element. For instance, for cylinder heads to which the device according to the invention has been applied, the plane of the abutment surface of the seat has a positioning tolerance, with respect to the reference plane of the head within a clamping tool, of about +/−1.3 mm.

A further type of defect, which is perhaps even more difficult to be detected, is that due to an angular positioning error between the component and its seat. Also in this case, the consequence of a non proper hammering may imply, for instance in the above mentioned case of valve rings, an engine malfunction. Also in this case, one could try to detect a variation of the force opposing hammering in the last hundredths of mm of the travel of the component before the latter comes into abutment against the bottom of its seat. The hammering force in the central portion of the travel, as an average, is higher with respect to the case of perfect alignment, but not necessarily greater with respect to the case of a high, but yet admissible, interference. Therefore, it is not possible to distinguish this defect by analysing the value of the average hammering force during the component travel, since it is necessary, as in the previous case, to carry out a careful analysis on the end portion of the travel. The variation of the value of the force opposing hammering during the end portion of the travel is to be attributed to the mechanical yield of the manipulating robot which is usually used to carry out the hammering operation, which robot tries to adapt its position to the geometric shape of the seat, when the latter is a little misaligned with respect to the theoretical position.

SUMMARY OF THE INVENTION

The object of the present invention is that of solving the above indicated problems, by providing a system and a method for controlling the quality of the hammering operation of a component during the hammering operation, which is able to detect all the above described defects in a simple and reliable manner.

In view of achieving this object, the invention provides a system for controlling the quality of the hammering operation of mechanical components, characterized in that it comprises:

an automated device adapted to bring a component in front of a seat, which is for receiving this component with interference, as well as to press said component within said seat until an interference fit coupling of the component is obtained, load cell means and linear transducer means associated with said device, respectively for measuring the hammering force to which the component is subjected, as well as the linear displacement of said component, during the hammering operation, and electronic control means for receiving the signals coming from said load cell means and said linear transducer means as well as for calculating the derivative over time of the hammering force and for analysing this derivative as a function of the linear displacement, said electronic control means being able to check the quality of the hammering operation on the basis of said derivative signal.

In particular, said electronic control means are able to detect where the graph of said derivative signal as a function of the linear displacement forms a peak, which is indicative that a fit coupling has been achieved, as well as to detect a hammering operation of unacceptable quality when this peak has a maximum height lower than a predetermined threshold value, or when the peak has a width greater than a predetermined threshold value.

Due to the above mentioned features, the system according to the invention is able to detect the exact position of the abutment plane of the seat receiving the component with great precision. The force raises almost vertically versus the displacement (not exactly vertically because of the elasticity of the mechanical structures) when the final hammering position is reached, so that its derivative reaches a maximum at this position. Therefore, by checking that this maximum is greater than a predetermined threshold value it is possible to secure the following important information: whether the component has come into abutment properly and the precise position of the abutment surface.

If machining chips are present between the seat and the component (such as a valve ring) a variation in the rigidity of the coupling in the final portion of the component travel takes place. In proximity of the end abutment position, the force curve is less steep with respect to the case of a proper hammering, so that the derivative will have a peak with a maximum of lower value. Similarly, if an error in the angular positioning between the component and its seat takes place, a steep raise in the force curve will take place when the component comes into abutment, only however on a portion of its surface. At that point, because of the force applied by the hammering device, typically a manipulating robot, the component will try to adapt with respect to the seat, which will give rise to a number of small displacements, while the values of the force are already high. As a result of this, the curve of the derivative will have maximum peak values substantially lower and above all with a peak width, versus the displacement, greater with respect to the theoretical case.

The check system according to the invention is therefore able to detect hammering defects in a simple and reliable manner, which cannot be detected by the systems according to the prior art.

The invention naturally provides also a checking method which can be worked out by means of the above described system.

Further features and advantages of the invention will become apparent from the description which follows with reference to the annexed drawings, given purely by way of non limiting example, in which:

BRIEF DESCRIPTION OF THE DRAWINGS

FIG. 1 shows one example of a possible application of the system and method according to the invention for assembling the valve rings into a cylinder head of an internal combustion engine, these valve rings being shown in the figure after that they have been fitted within the respective seats, FIG. 2 shows a hammering tool which can be mounted on the wrist of a manipulating robot forming part of the system according to the invention.

DETAILED DESCRIPTION OF THE INVENTION

Figure 3:
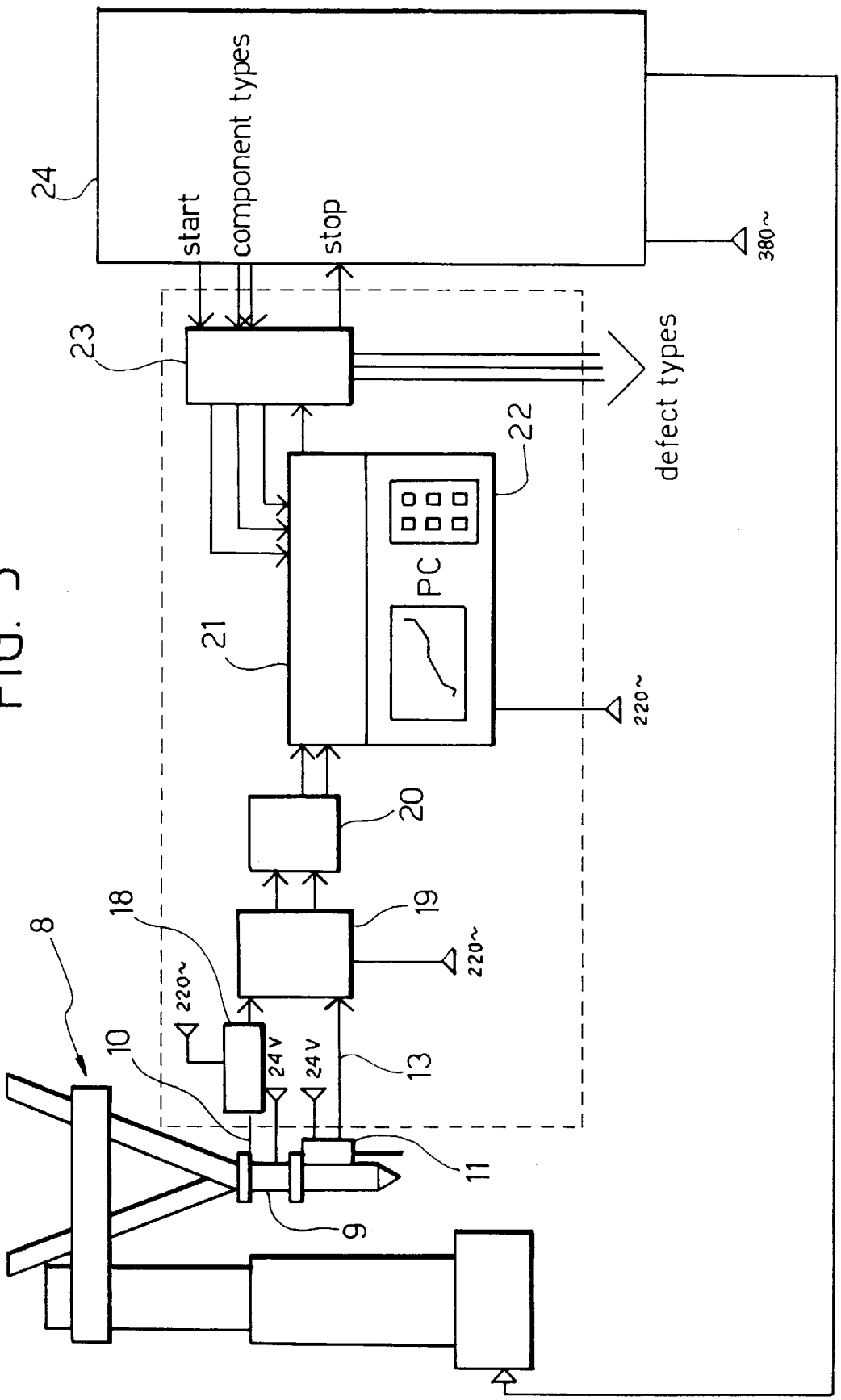
FIG. 3 is a diagrammatic view of the system according to the invention.

With reference to FIG. 1, the system according to the invention can be used for controlling the quality of the fit coupling of rings 1 constituting the seats for cooperating valves of an internal combustion engine (not shown) which are fitted with interference within annular slots 2 formed in the lower surface 3 of the body of a cylinder head 4 of an internal combustion engine. Each annular slot 2 has an abutment surface 2a against which the cooperating ring 2 is to come into abutment as a result of a hammering movement along the direction indicated by arrows A in FIG. 1, i.e. along an axial direction perpendicular to a plane containing the abutment surfaces 2a.

In order to be fitted, each ring 1 is arranged on the tip of a tool 5 which on its turn is secured (by means of a transverse tightening screw 6 in the case of the illustrated example) to a body 7 which is to be mounted on the wrist of an industrial manipulating robot, shown diagrammatically and designated by 8 in FIG. 3. In this figure, the robot 8 is shown diagrammatically in the form of a robot of the type available on the market under the trademark "TRICEPT". However, the invention is naturally applicable making use of any type of industrial robot suitable for carrying out the hammering operation whose quality must be checked. For this reason, in the present description the structure of the robot is not described in detail, also because, as already indicated, it is of a type known per se and can be replaced by any other known robot structure. To body 7 there is associated a load cell 9 of any known type (visible in FIG. 2 shown diagrammatically in FIG. 9) adapted to send a signal indicative of the hammering force to which the ring 1 is subjected during the hammering operation along an electric line 10. With the tool 5 there is further associated a linear transducer 11 (visible in FIG. 2 and shown diagrammatically in FIG. 3) provided with a feeler pin 12 which is pushed upwardly (with reference to FIG. 2) during the hammering operation, so as to enable transducer 1 to send a signal indicative of the linear displacement of ring 1 during the hammering operation along a line 13 (FIG. 3).

In the example shown in FIG. 2, merely for reasons due to the particular application shown, the feeler pin 12 is in contact with a sliding member 14 which is rigidly connected to a stem 15 slidably mounted within tool 5 and terminating with a feeler pin 16, which projects downwardly from the tool and is to be introduced, during the hammering operation, into the hole 17 for engagement of the valve stem (see FIG. 1) until it comes into contact with a stop surface (not shown in FIG. 1) exactly when the condition is reached in which ring 1 is facing the respective seat 2, at the beginning of the hammering travel. In this manner, the feeler element 11 is actuated exactly from the moment at which the operative hammering stroke of ring 1 within seat 2 begins.

Also with reference to FIG. 3, the signals sent by the load cell 9 and the linear transducer 11 reach, after that they have passed through an amplifier 18 and conditioning units 19, 20 to an acquisition board 21 associated to a personal computer 22. The board 21 is further connected by means of an input/output unit 23 to the electric control cabinet of robot 8, designated by 24, which attends to sending the start signal and the information relating to the component to unit 23, whereas it is able to receive a stop signal for this unit, during the checking process.

Figure 4:
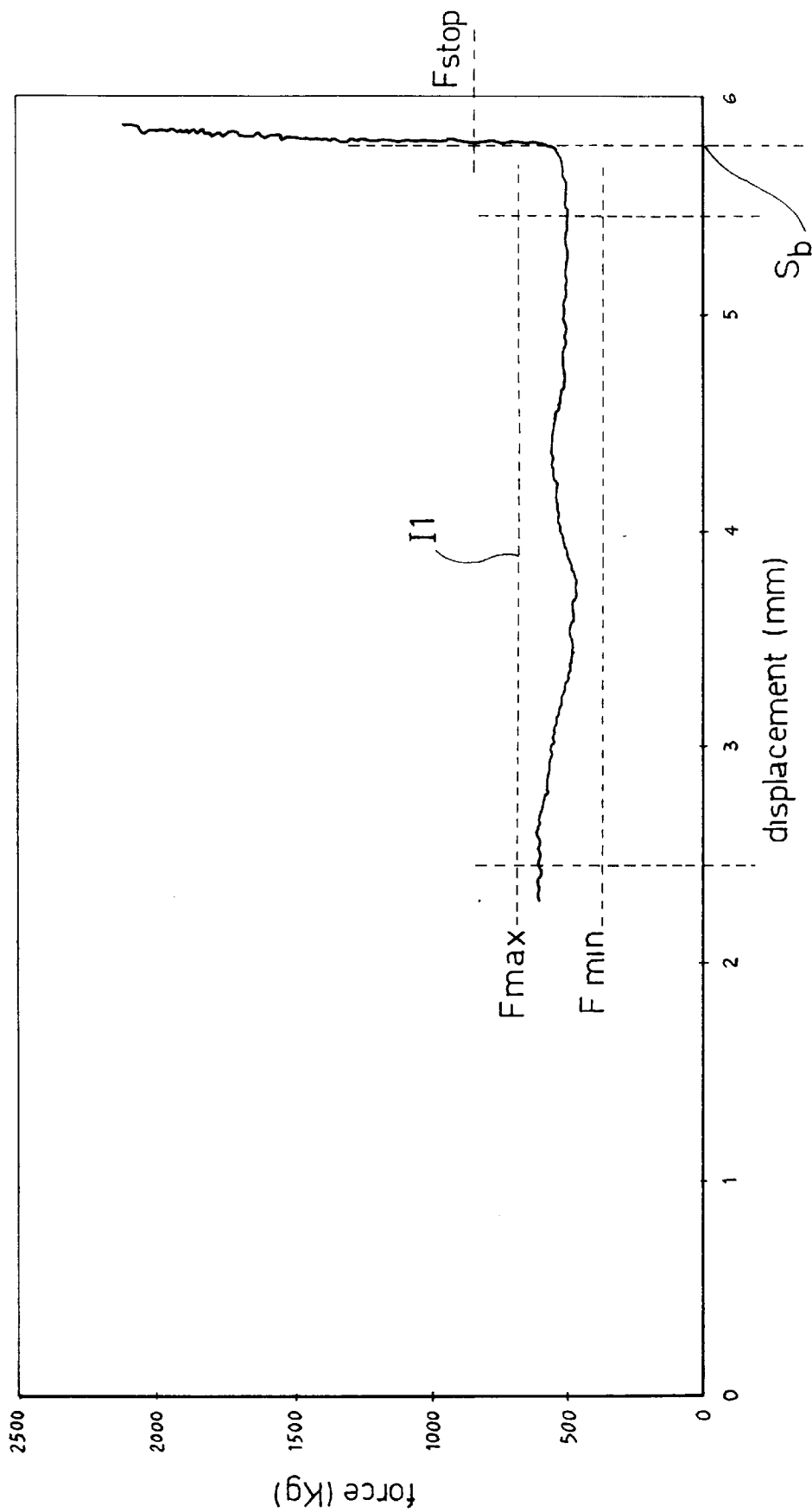
FIGS. 4, 5 show the graphs of the hammering force and its derivative with time as a function of the hammering travel, which show the basic principles of the method according to the invention.
Figure 5:
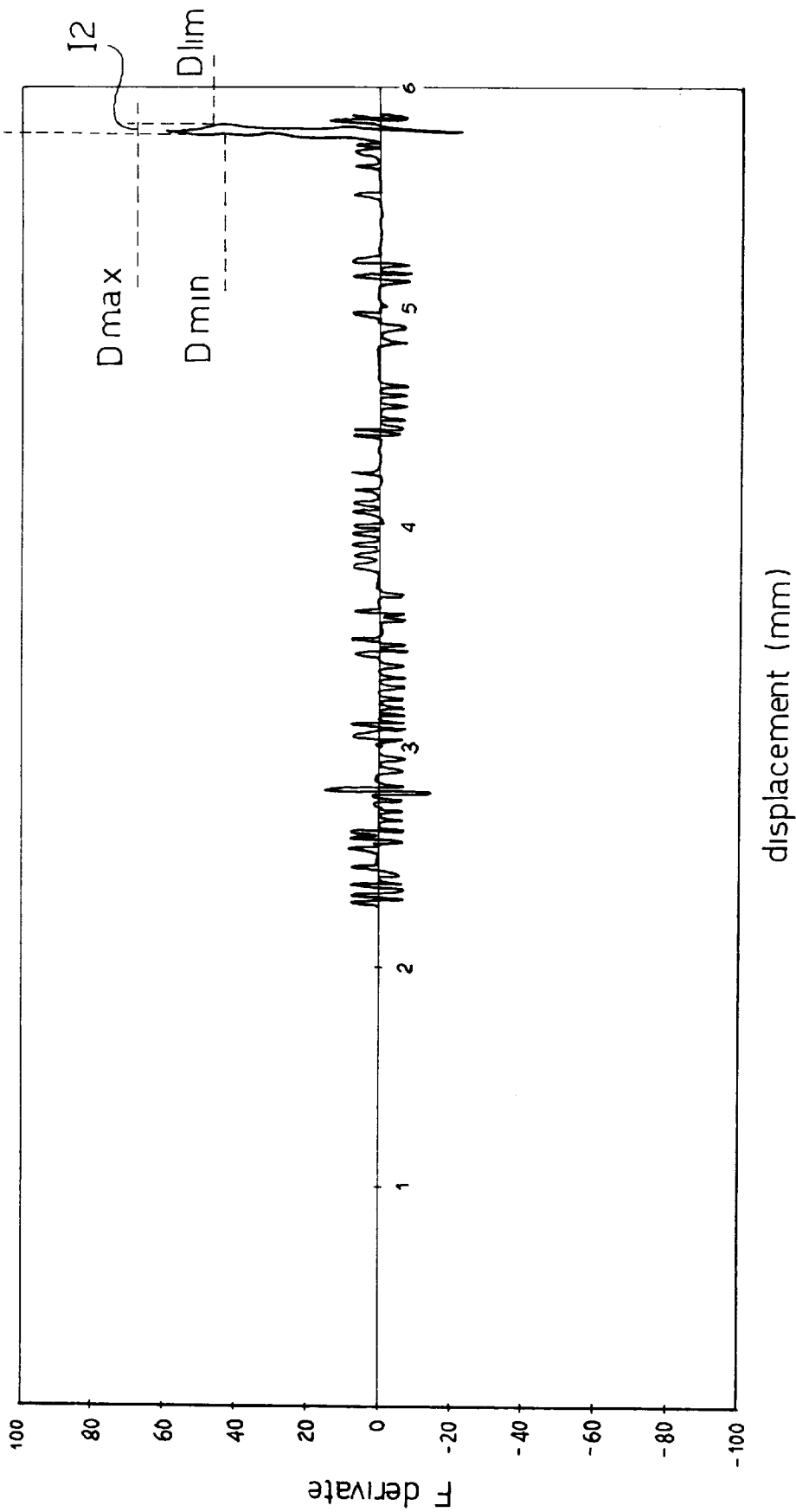

In the system according to the invention, during the hammering operation the variation of the hammering force is detected in the course of the travel or stroke to which the ring is subjected in the hammering operation (FIG. 4). At the same time, the derivative with time of the hammering force is calculated and this derivative is analysed as a function of the hammering travel (FIG. 5).

Figure 6:
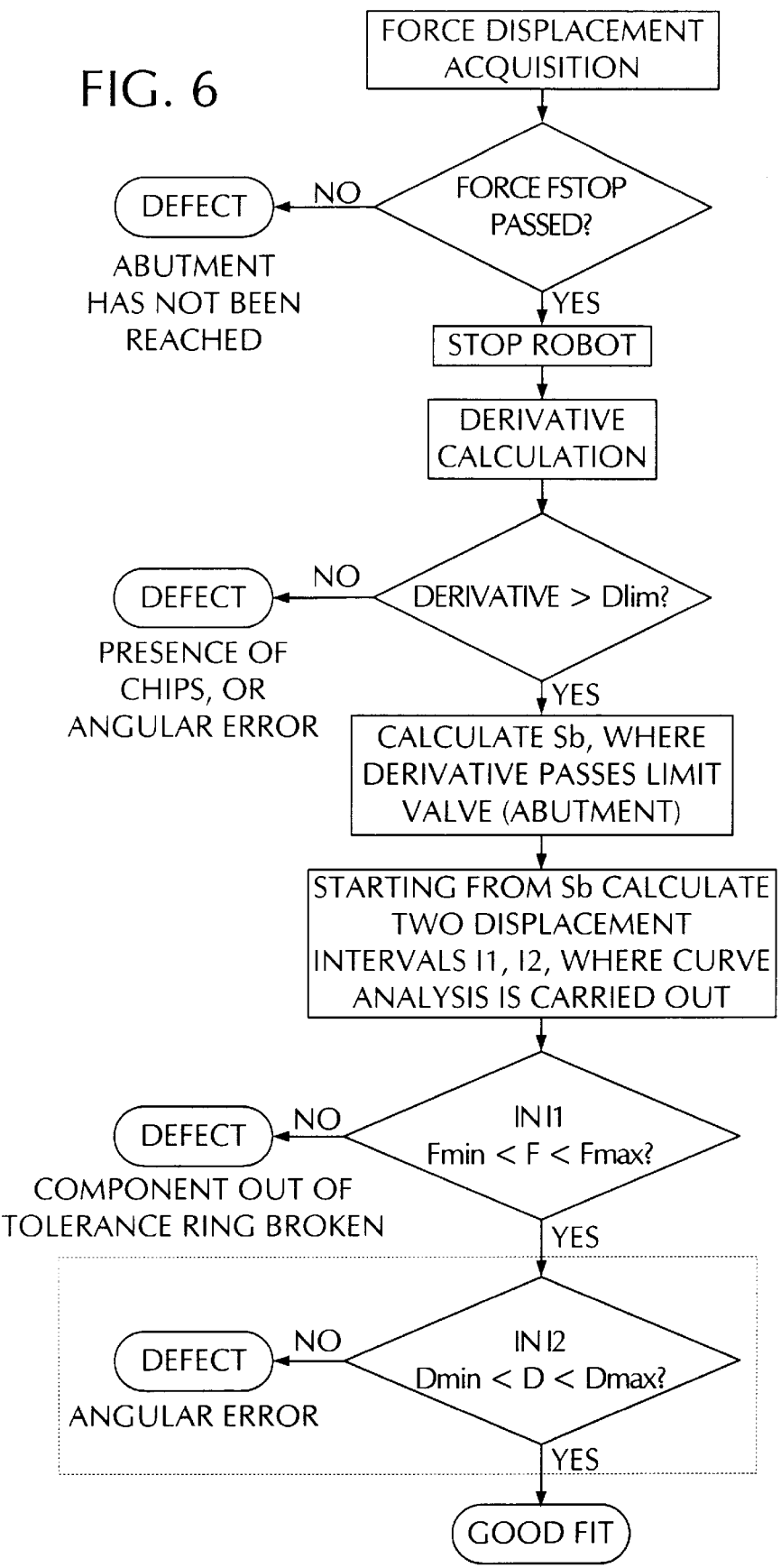
FIG. 6 is a block diagram which shows some stages of the method according to the invention.

With reference to FIG. 6, the essential stages of the method according to the invention are the following.

Firstly, the system acquires the values of the hammering force as a function of the displacement of the component during the hammering operation (graph of FIG. 4). The robot is stopped when force $F_{stop}$ is reached which is indicative that the component has come into abutment against the bottom of its seat. If this force is not passed, the presence of a defect is signalled, since the component has not reached the final position into abutment against the seat bottom. If force $F_{stop}$ is passed, after that the robot has been stopped, the derivative of the hammering force with time is calculated, and this derivative is analysed as a function of the linear displacement of the component during the hammering operation (graph of FIG. 5). If the value $D_{lim}$ of the derivative is not passed, corresponding to the component reaching a final position into abutment against the seat bottom, the presence of a defect is signalled, due to the presence of a machining chip or an error in the angular positioning of the component. In the opposite case, the value $S_b$ of the displacement is calculated (see FIG. 4), at which the component comes into abutment against the seat bottom and the derivative passes its limit value. At this point, starting from $S_b$, the system calculates two displacement intervals $I_1$ (FIG. 4) and $I_2$ (FIG. 5) where the analysis is carried out. After this calculation, the analysis within interval $I_1$ is carried out. At this interval, it happens that the hammering force F is always between a minimum value $F_{min}$ and a maximum value $F_{max}$, corresponding to the minimum and maximum interference, respectively. If it is not so, the presence of a defect is signalled, which is due to that the component is out of tolerance or the component is broken. In the case instead of a favourable check, the system start the analysis of interval $I_2$, where it must be verified that the value of the derivative is always between the minimum and maximum values $D_{min}$, $D_{max}$. In the negative case, the presence of a defect is signalled, due to an error in the angular positioning of the component with respect to its seat. In the affirmative case, final confirmation is given that the fit coupling is of acceptable quality.

As it clearly appears from the foregoing description, the system and method according to the present invention are able to detect hammering defects in a simple and reliable manner which are not always detectable by the systems according to the prior art.

Naturally, while the principle of the invention remains the same, the particulars of construction and the embodiments may widely vary with respect to what has been described and illustrated purely by way of example, without departing from the scope of the present invention.

What is claimed is:

1. System for checking the quality of a hammering operation of a mechanical component, comprising:

an automated device adapted to bring a component in front of a seat for receiving said component with an interference fit, as well as to press said component into said seat until the interference fit is achieved, load cell means and linear transducer means associated with said device, respectively, for measuring a hammering force to which the component is subjected, as well as a linear displacement of said component, during a hammering operation, electronic control means adapted to receive signals coming from said load cell means and said linear transducer means as well as to provide a derivative signal of the hammering force with respect to time and to analyse said derivative signal as a function of the linear displacement, said electronic control means being able to check the quality of the hammering operation on the basis of said derivative signal.

2. Checking system according to claim 1, wherein said electronic control means are able to detect where a graph of said derivative signal as a function of the linear displacement forms a peak, which is indicative that an interference fit has been achieved, as well as to detect an interference fit of unacceptable quality when the peak has a maximum height lower than a predetermined threshold value or a width greater than a predetermined threshold value.

3. Checking system according to claim 1, wherein said device carrying the component is a manipulating robot.

4. Method for checking the quality of the hammering operation of mechanical components, comprising:

bringing a component in front of a seat which is adapted to receive the component with an interference fit, and pressing said component into said seat until the interference fit is obtained, measuring a hammering force to which the component is subjected, as well as a linear displacement of said component, during a hammering operation, calculating a derivative signal of the hammering force with respect to time and analysing said derivative signal as a function of the linear displacement of the component during the hammering operation and checking the quality of the hammering operation on the basis of said derivative signal.

5. Method according to claim 4, wherein after measuring the hammering force and the linear displacement during the hammering operation, the method comprises detecting whether the hammering force reaches a predetermined value corresponding to the component coming into abutment against a seat bottom and signalling, in a negative case, the existence of a defect since the abutment has not been reached, while in an affirmative case the hammering operation is interrupted and said calculating of the derivative signal of the hammering force is started; said method further comprising checking whether the value of the derivative signal passes a minimum admissible value and, in a negative case, signalling the existence of a defect, while in an affirmative case the value of the linear displacement corresponding to the reaching of a limit derivative value is determined and two intervals of a variation of the linear displacement during the hammering operation are determined, corresponding to an approach stage of the component to the seat bottom and a final stage of the component travel; said method further comprising checking whether in a first of said intervals the hammering force is kept between a minimum value and a maximum value and in a negative case an existence of a defect is signalled, whereas in an affirmative case said method further comprises checking whether in a second of said intervals the derivative value is kept between a minimum value and a maximum value, in a negative case the existence of a defect being signalled, whereas in an affirmative case final confirmation of an interference fit of unacceptable quality is given.

* * * * *